(12) United States Patent
Atalla

(10) Patent No.: US 11,974,696 B2
(45) Date of Patent: May 7, 2024

(54) METHOD FOR COVERING AN ITEM WITH A FRAMED COVER

(71) Applicant: Elie Atalla, Harrington Park, NJ (US)

(72) Inventor: Elie Atalla, Harrington Park, NJ (US)

(73) Assignee: Divergent Devices, Harrington Park, NJ (US)

( * ) Notice: Subject to any disclaimer, the term of this patent is extended or adjusted under 35 U.S.C. 154(b) by 377 days.

(21) Appl. No.: 16/657,918

(22) Filed: Oct. 18, 2019

(65) Prior Publication Data

US 2020/0046167 A1    Feb. 13, 2020

Related U.S. Application Data

(63) Continuation of application No. 15/964,028, filed on Apr. 26, 2018, now abandoned, which is a continuation of application No. 15/445,015, filed on Feb. 28, 2017, now abandoned.

(51) Int. Cl.
*A47J 37/07*    (2006.01)
*A47C 31/11*    (2006.01)
*B60J 11/04*    (2006.01)

(52) U.S. Cl.
CPC ........... *A47J 37/0786* (2013.01); *A47C 31/11* (2013.01); *A47C 31/113* (2013.01); *B60J 11/04* (2013.01)

(58) Field of Classification Search
CPC .... A47J 37/0786; A47C 31/11; A47C 31/113; B60J 11/04
See application file for complete search history.

(56) References Cited

U.S. PATENT DOCUMENTS

| | | | | |
|---|---|---|---|---|
| 1,007,829 A | * | 11/1911 | Wesbrook | E04H 15/38 135/913 |
| 2,798,501 A | * | 7/1957 | Oliver | B60J 11/00 135/88.06 |
| 3,712,316 A | * | 1/1973 | Leonard | B60P 3/38 135/132 |
| 4,561,480 A | * | 12/1985 | Underwood | A01G 20/43 383/117 |
| 4,783,177 A | * | 11/1988 | Reed | B65D 33/1666 206/335 |
| 4,856,436 A | * | 8/1989 | Campbell | E04H 1/1238 109/38 |
| 5,451,107 A | * | 9/1995 | Ricker | B65F 1/00 383/34 |

(Continued)

*Primary Examiner* — Tri M Mai
(74) *Attorney, Agent, or Firm* — Thomas Heed; Heed Law Group PLLC

(57) ABSTRACT

A method for covering an item with a framed cover is disclosed. A rigid tubular frame that is larger than the maximum planar dimensions of the item to be covered is constructed. The rigid tubular frame is built into a cover's opening makes it possible to find the opening, lift the cover evenly, place the cover over the item, rotate the cover to the proper position and drop the cover in an even manner and without snagging. In addition, the tubular frame can be made to fold so that the cover can be stowed away for storage in a controlled manner, and by folding the tubular frame on a larger size cover it makes it easier for the user to control the covers weight because its center of gravity is held closer to the user's body until it is properly positioned and opened on top of the item to be covered.

7 Claims, 4 Drawing Sheets

(56) References Cited

U.S. PATENT DOCUMENTS

| | | | | |
|---|---|---|---|---|
| 5,542,560 A | * | 8/1996 | Gerster | F21V 1/06 220/252 |
| 5,655,559 A | * | 8/1997 | Zembik | E04H 15/38 135/147 |
| 5,832,943 A | * | 11/1998 | Johnson | E04H 15/36 D21/837 |
| 5,842,495 A | * | 12/1998 | Egnew | E04H 15/38 135/147 |
| 7,013,904 B2 | * | 3/2006 | Kofler | E04H 6/04 135/132 |
| 2011/0067790 A1 | * | 3/2011 | Bzdell | B65F 1/1426 150/154 |

* cited by examiner

METHOD FOR COVERING AN ITEM WITH A FRAMED COVER

CLAIM OF PRIORITY

This application claims priority to U.S. Non-Provisional Utility application Ser. No. 15/964,028 filed Apr. 26, 2018, which, in turn, claimed priority to U.S. Non-Provisional application Ser. No. 15/445,015, filed Feb. 28, 2017.

FIELD OF INVENTION

The present invention relates to covers for enclosing items or objects, in particular, to collapsible framed covers for the same.

BACKGROUND OF INVENTION

Placing and removing flexible covers from large items is difficult and time-consuming. Typically, cloth or plastic covers will have an opening and must be dropped or lowered onto an item such that the flexible cover's opening properly accepts the item to be covered. In addition, if the flexible cover is fitted to a particular shape, such as an outdoor grill, table or chair, it becomes more difficult because the cover must be lowered onto the item and rotated such that the fitted spaces under the cover are matched to the intended parts of the item.

It is difficult to find the opening and proper position for a fully collapsed, flexible cover. Further, as a flexible material is pulled down from one side it may become too tight or out of position on the other side, so a back and forth, iterative process is required to fully pull down a cover. Other covers are completely flexible and must be opened partially, then pulled down over the item, then re-positioned and pulled down again and so on until all parts are under the cover as intended. The user also risks damaging the cover when force is applied to the cover during installation.

The covers in the prior art also problematic because they are not capable of being secured after installation. For example, excessive wind could displace the cover partially or completely.

The reason these devices do not work well is because there is no way to support the material manually. It is by nature flexible and will always fall where it is dropped.

Prior art cover also pose problems when being removed. During removal the cover can get caught on any of the parts of the covered item that protrude or are in a fitted section of the cover. Thus, the cover is susceptible to damage and unwanted wear and tear.

Also, covers in the prior art cannot be folded into a compact configuration and are often difficult to neatly store for the same reason. Often times, the prior art covers are simply removed and placed near the item or object while in use, taking up much needed space and creating an eye sore.

Therefore, a need exists for a flexible cover that can be easily installed on items and objects, while being capable of being conveniently removed and stored.

SUMMARY OF THE INVENTION

This summary is intended to disclose the present invention, a framed cover. The embodiment and description are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. Issues such as form-factor are addressed through the use of multiple examples.

The present invention solves the problems of the prior art while providing additional advantages. The present invention is an improvement on what currently exists.

In general, the present invention, a framed cover, provides a flexible cover with a framed opening, which allows a user to easily identify the opening (because it never closes, except partially, if folded) and drop the framed cover in proper rotational position to match fitted sections with their intended parts on the item. A rigid tubular frame that is built into the flexible cover's opening makes it possible to find the opening, lift the framed cover evenly, place the framed cover over the item, rotate the framed cover to the proper position and drop the framed cover in an even manner and without snagging. The tubular frame enables an even control and positioning of the framed cover above and around the item as it is being lowered thereon. Further, the weight of the tubular frame will help in holding the framed cover down and in proper position.

During removal, the tubular frame embedded in the framed cover allows a user to lift all sides of the framed cover simultaneously thereby preventing snagging. Then the folding joint, if included, allows user to concentrate the mass of the framed cover in a central position in front of their body to make it easier to support.

In addition, the tubular frame is foldable so that the framed cover can be stowed away for storage in a controlled manner. By folding the tubular frame on a larger size framed cover, it makes it easier for the user to control the weight of the because its center of gravity is held closer to the user's body until it is properly positioned and opened on top of the item to be covered. If the tubular frame folds it may also be more easily stored when not in use.

The flexible cover is made of a suitable material for the item to be used. For example, a waterproof canvas for outdoor applications may be appropriate. The material is cut into the right shape, or shapes, and stitched together into a flexible cover in typical fashion. However, at or near the opening, a tubular frame would be inserted around the full perimeter of the opening. This may be made of metal or plastic tubing and should be matched with the use and conditions it will be exposed to. For example, waterproof materials could be used for outdoor use. Lighter material could be used for a smaller flexible cover, and stronger material could be used for larger, heavier flexible covers.

As it assists a human in manipulating a flexible and unpredictable object, likewise it could be used to help a machine or robot manipulate and control a framed cover.

BRIEF DESCRIPTION OF THE DRAWINGS

The present invention is illustrated with 24 drawings on 12 sheets.

Figure 1:
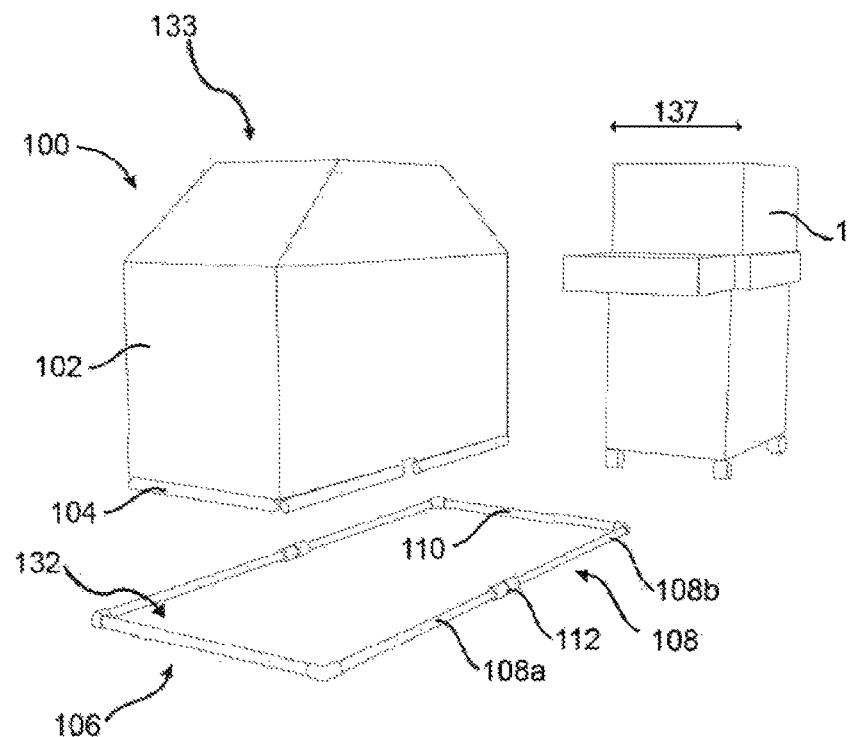
FIG. 1 is a perspective view of the present invention, a framed cover, along with an item it is intended to cover.

To facilitate an understanding of the invention, identical reference numbers have been used, when appropriate, to designate the same or similar elements that are common to the figures. Further, the features shown in the figures are not necessarily properly dimensioned nor drawn to scale but are shown for illustrative purposes only.

DETAILED DESCRIPTION OF THE DRAWINGS

The following descriptions are not meant to limit the invention, but rather to add to the summary of invention, and illustrate the present invention, a framed cover. The present invention is illustrated with a variety of drawings showing the primary embodiment of the present invention, with examples presented of the various form-factors that the present invention can take.

Although this invention will be described in its exemplary forms with a certain degree of particularity, it is understood that the present disclosure has been made only by way of example and numerous changes in the details of the construction and arrangement of parts may be employed without departing from the spirit and scope of the invention.

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left are used to describe the accompanying figures. The terminology includes the words above specifically mentioned, derivatives thereof, and words of similar import.

Referring to the figures, the present invention provides an easy to use framed cover for convenient installation, removal and storage. The framed cover protects an item or object from dust, rain, snow, etc. and can also be used to conceal the item or object. The primary embodiment of a framed cover of the present invention is described in detail below, with examples of the various form-factors that the framed cover can take.

In general, the framed cover of the present invention includes a flexible cover operably coupled to a frame. The flexible cover is comprised of a flexible material, such as canvas, plastic or cloth, which is cut and assembled into the shape of the item or object to be covered. The flexible cover can be also be constructed of materials that are lightweight, mildew-resistant, UV-resistant and durable. The flexible cover may have fitted areas that are intended to account for and help secure it around various parts of the item to be covered.

The flexible cover is operably coupled to a frame, which can be stitched into or otherwise attached to or near the perimeter of the flexible cover's opening. The tubular frame extends around all sides of the opening. The tubular frame is constructed of a rigid but lightweight material capable of withstanding outdoor elements. For example, the tubular frame could be high density, Schedule 80 PVC piping. Other durable plastics could be used as well. The tubular frame could also be constructed with lightweight, rust-resistant metals such as aluminum. The tubular frame is constructed from members. The members of the tubular frame may be hollow or solid. The members can be cylindrical or rectangular, with a circle or square cross-section, respectively.

Referring to FIGS. 1-4, a framed cover 100 of the present invention is shown. The framed cover 100 has a form-factor, including a shape and size, that allows it to cover an outdoor grill 1. The framed cover 100 includes a flexible cover 102 extending downwardly to a free end 104, forming an opening (not shown) within a lower perimeter. In this example, the flexible cover 102 is fitted for an outdoor grill 1 with protruding shelves on both sides. Thus, a fitted area is provided where less material is required in the upper portion of the grill 1 and more fabric is required to fit around the protruding shelves. The flexible cover 102 has a continuous exterior surface 133. The flexible cover 102 has a continuous exterior surface 102 and a continuous interior surface (not shown), disposed in opposition to the continuous exterior surface 102.

The framed cover 100 includes a tubular frame 106 having a pair of opposing longitudinal members 108 coupled with a pair of transverse members 110 at respective ends of the longitudinal members 108, thus forming a substantially rectangular configuration. The tubular frame 106 can be hollow or solid. The tubular frame 106 is made from generally cylindrical members 108, 110, meaning that the members have a circular cross-section. The tubular frame 106 could take on other shapes depending on the item or object the framed cover 100 is intended to cover. The frame 106 encloses a rectangular area 132. The longitudinal members 108 and transverse members 110 are held together with joint members 112. The longitudinal members 108, transverse members 110, and joint members have a definable perimeter 108, 110, 112.

The free ends 104 create an opening 104 that accommodates the item to be covered 1. The dimensions such as width 137 and length 136 of the item to be covered 1 are determined, in order to ascertain maximum planar dimensions of the item 1 over which the opening defined by the free ends 104 must fit. The maximum planar dimensions of the item to be covered are defined with respect to a reference plane, such as the ground or the surface upon which the item to be covered rests. The maximum planar dimensions are parallel to the reference plane. For example, in FIG. 2, the maximum planar dimensions 136 and 137 are parallel to the lower termination of 614, which represents the surface upon which the item to be covered 1 is resting, such as the ground. Auxiliary dimensions 610, 611, 612, 613, 614 can be measured to account for protrusions. The free ends 104 the flexible cover 102 are double-stitched along the longitudinal members 108 of the tubular frame 106 to form a secure seam. The flexible cover 102 can be constructed of waterproof, water-resistant, and/or dust-resistant material. Other securing methods can be used. For example, the free ends 104 the flexible cover 102 can be glued along the longitudinal members 108 of the tubular frame 106 to form a secure seam. Additionally, the flexible cover 102 and/or the tubular frame 106 can be provided with fasteners, such as a hook-and-loop fastener (or Velcro) so that the framed cover 100 could be secured in a folded state, as shown in FIG. 3. The fasteners could also be configured to be secured to the item or object.

Figure 4:
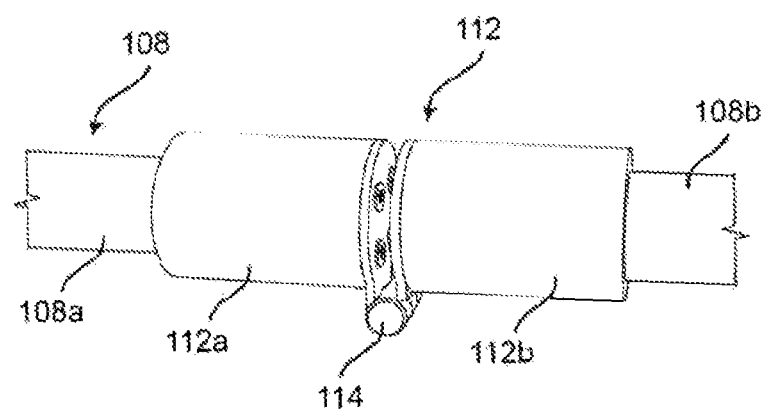
FIG. 4 is an isolation view of a frame joint of the frame cover.

Referring to FIG. 4, each longitudinal member 108 of the tubular frame 106 includes a joint member 112 at a midportion thereof. Each longitudinal member 108 includes a first member 108a and a second member 108b pivotally coupled together. The joint member 112 includes a pair of caps 112a, 112b which are fixedly coupled to opposing ends of the first and second members 108a, 108b, respectively. The caps 112a, 112b and a hinge 114 are preferably constructed of stainless steel to prevent corrosion but other materials could be used. Looking at FIG. 4, the caps 112a, 112b are parallel and in-line with one another. As is apparent from FIG. 4, in this state, if cap 112a is rotated clockwise and cap 112b is rotated counter-clockwise, the caps 112a, 112b interfere with one another, preventing any movement. In this state, the hinge only allows cap 112a to be rotated counter-clockwise while cap 112b is rotated clockwise. The hinge is therefore referred to as a "one-way" hinge 114, because it only allows the caps to move in one direction. The one-way hinge allows for the frame to collapse in one direction but not the other. The fixed engagement is accomplished with adhesive but could also fitted by form fit, threaded engagement or welding. Alternatively, the caps could be replaced with plugs for fixedly engaging with openings of the first and second members 108a, 108b. A one-way hinge 114 is coupled with each opposing cap 112a, 112b to form a pivotal engagement such that the first and second members 108a, 108b are pivotable downward with respect to the one-way hinge 114 when collapsing the framed cover 100. With this configuration, the tubular frame 106 will not collapse during installation and removal when a user applies an upward force to the tubular frame 106 to lift the same.

Referring to FIGS. 1-4, in operation, the framed cover 100 is installed on an item or object 1 such that the entire item or object is covered from top to bottom as shown in FIG. 1. As shown in FIG. 1, there are joint members 112 on members 108 opposed to each other, each joint member 112 having a one-way hinge 114 as shown in FIG. 4. Here, the user(s) could lift the entire framed cover 100 over the item or object and accurately align the center of the framed cover 100 with the one-way hinge 114 with the center of the grill 1, as shown for example in FIG. 2. The user could open the tubular frame 106 and evenly lower all four sides without having to change his standing location or hand grip location. The tubular frame further provides for a ballast which naturally pull the flexible cover 102 down and eliminates the need for tie downs.

Figure 2:
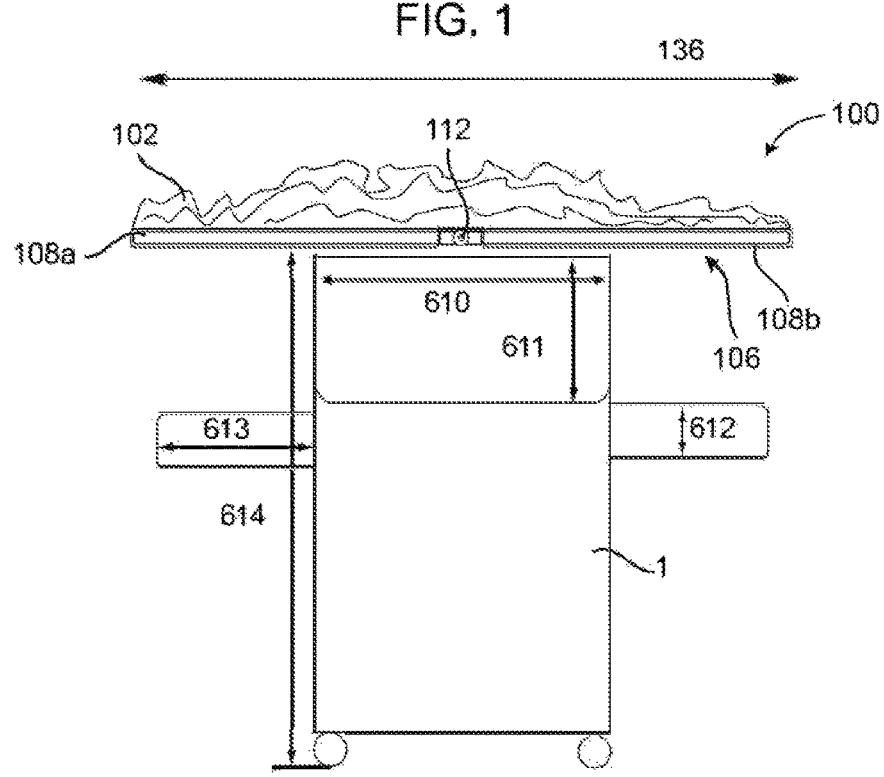
FIG. 2 is a side view of the framed cover positioned over the item it is intended to cover.
Figure 3:
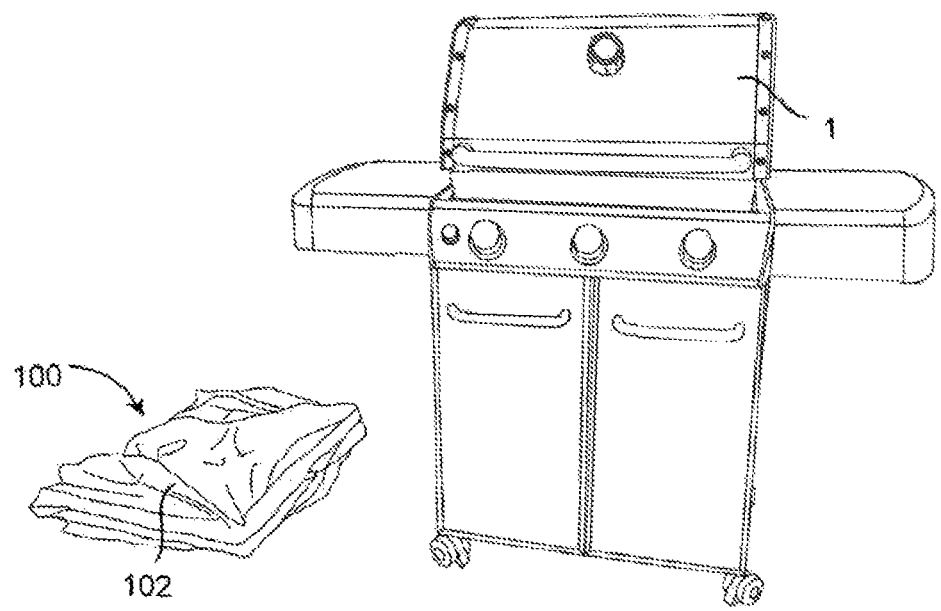
FIG. 3 is a front view of the frame cover, folded, juxtaposed to the item it is intended to cover.

As shown in FIGS. 1-4, to remove the framed cover 100, a user or users engages the tubular frame 106 and lifts the framed cover 100 upward from the item or object 1 as shown in FIG. 2. The tubular frame 106 is folded about the one-way hinge 114 such that corresponding first and second members 108a, 108b of each longitudinal member 108 are pivoted downward with respect to the one-way hinge 114 to a position where the first and second members 108a, 108b are against each other in a fully folded state as shown in FIG. 3. Thus, the framed cover 100 is folded into a substantially flat configuration. In this configuration, an outer surface of the flexible cover 102 is exposed even in the folded state while an inner surface of the flexible cover 102 is continues unexposed and kept clean. Removal is equally controllable as installation of the framed cover 100 as the framed cover 100 allows for a user to lift the entire flexible cover 102 simultaneously. After removal, the user can fold the tubular frame 106 and flexible cover 102 in one movement, and then the framed cover 100 could be placed neatly in any location. The optional fasteners described above could be used to hold the framed cover 100 closed to allow for easy carrying and storage.

Disassembly is not required if the free ends 104 of the flexible cover 102 are durably stitched or glued together, encompassing the tubular frame 106, as the tubular frame 106 is not then removable from the flexible cover.

Figure 5:
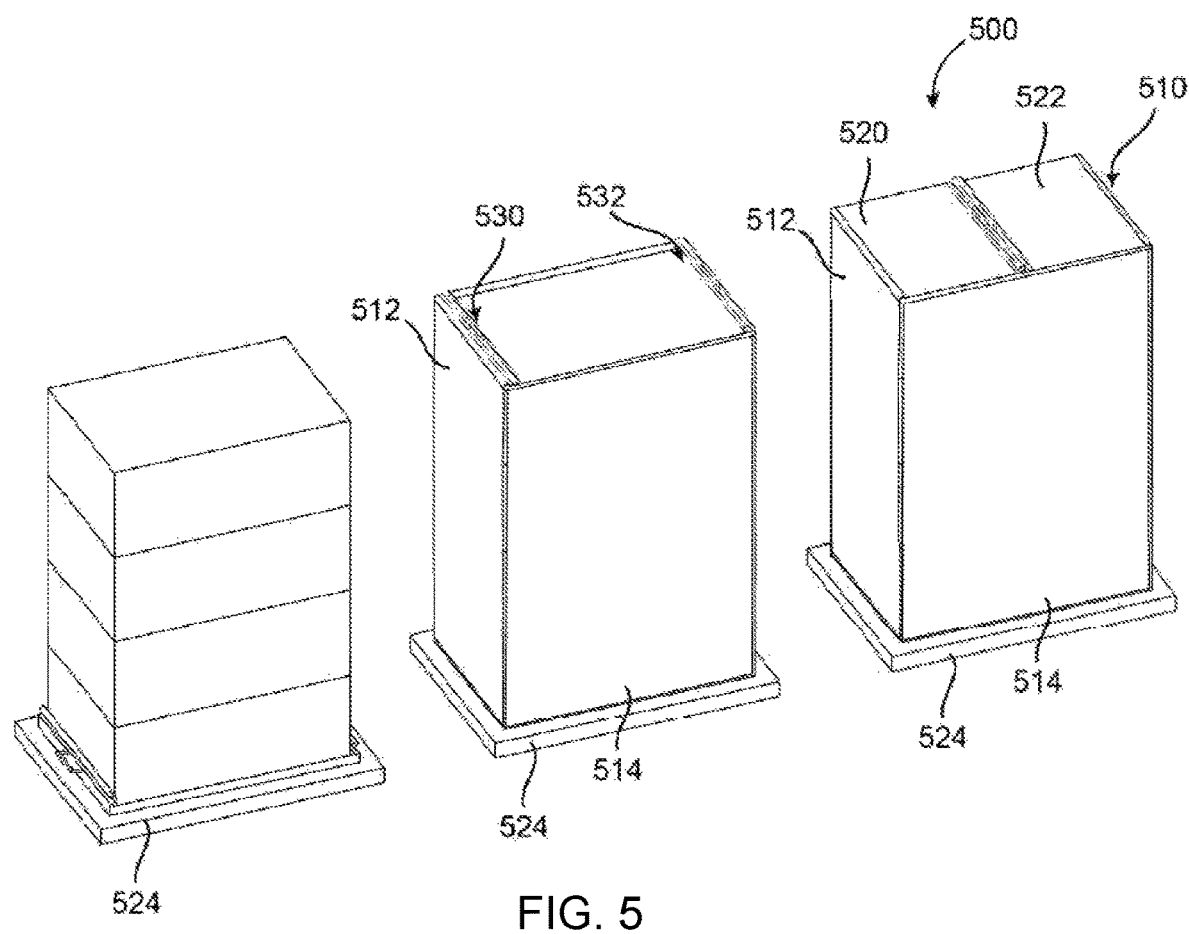
FIG. 5 is a perspective sequence drawing showing an embodiment of the framed cover being put in situ.

Referring to FIGS. 5-8, a framed cover 500 of the present invention is shown. The framed cover 500 includes a flexible cover 510 having four side portions 512, 514, 516, 518 and two top portions 520, 522 extending from side portions 512 and 516. Thus, side portions 514 and 518 are shorter in length by the length of the top portions 520, 522. The flexible cover 510 is configured such that each portion is independently operably coupled to a separate spring-loaded roller (not shown) fixed to respective sides of a base 524. That is, each portion of the flexible cover 510 is extendable upward into an engaged state and retractable downward into a disengaged state, as shown in FIG. 5.

Figure 6:
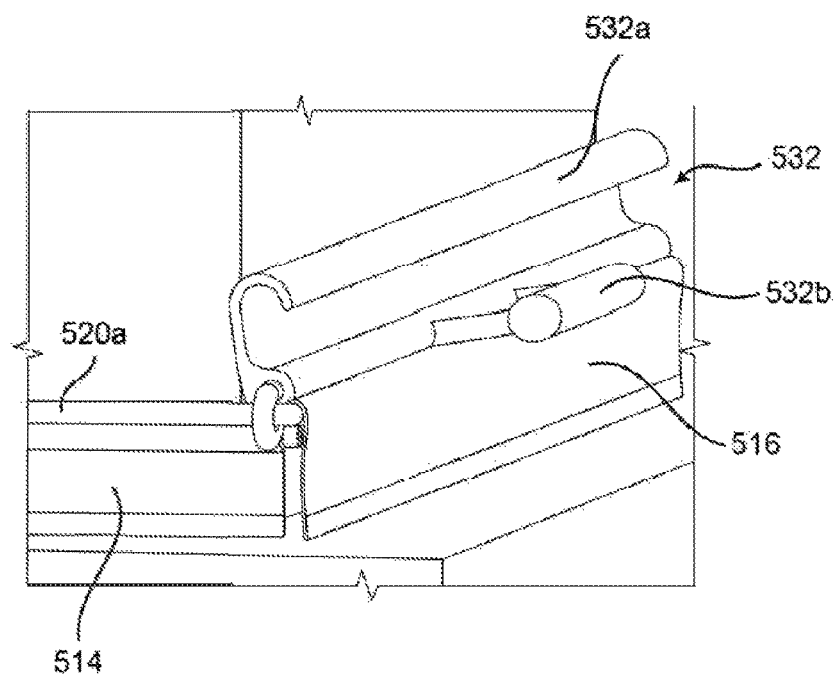
FIG. 6 is an isolation perspective view of an engagement member of an embodiment of the framed cover in a retracted position.
Figure 7:
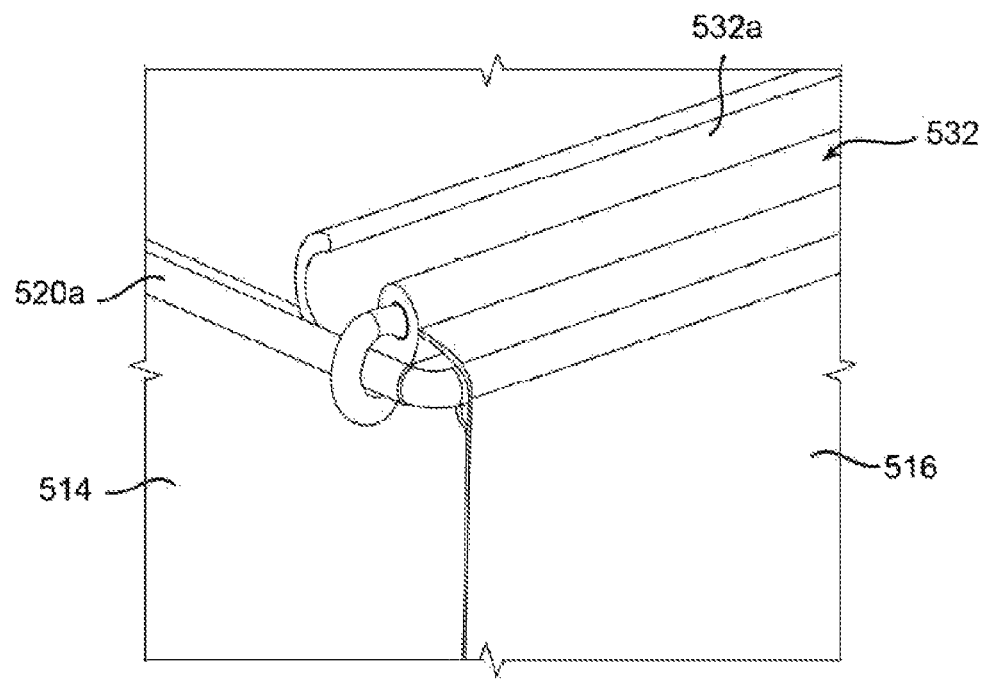
FIG. 7 is an isolation perspective view of the engagement member of an embodiment of the framed cover.
Figure 8:
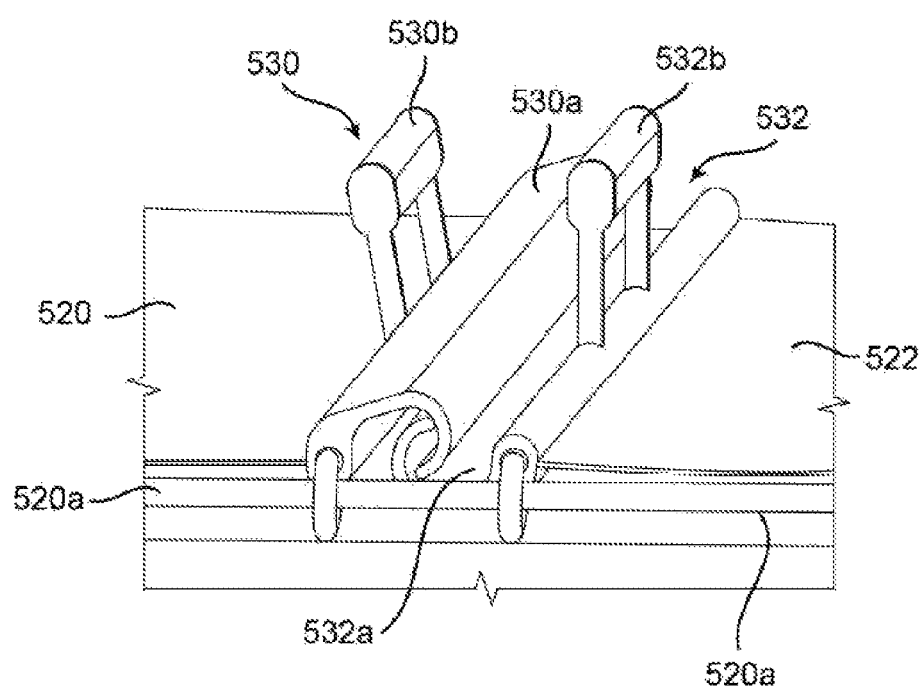
FIG. 8 is an isolation perspective view of an embodiment of the frame cover in an engaged state.

Still referring to FIGS. 5-8, the framed cover 500 includes a locking mechanism comprising a first locking member 530 coupled to the first top portion 520 and a second locking member 532 coupled to the second top portion 522. Each locking member 530, 532 extends transversely along free ends of the top portions 520, 522 and is slidably coupled to tubular frame members 520a which extend along top edges of the side portions 514, 518, as shown in FIGS. 6-8. Each locking member 530, 532 includes an engagement member 530a, 532a integrally formed with a handle 530b, 532b. Thus, the side portions 512, 514, 516, 518 are movable simultaneously.

In operation, the framed cover 500 is retracted when not in use, as shown in FIGS. 5 and 6. The framed cover 500 is applied to an item or object by engaging the handles 530a, 532b upward. Side portions 512, 514, 516, 518 are extended to a top edge of the item or object where side portions 514, 516 are no longer extendable, as shown in FIGS. 5 and 7. The top portions 520, 522 are further extended toward each other and the engagement members 530a, 532a are engaged into an engaged state, as shown in FIG. 8.

The present invention may be embodied in other specific forms without departing from its spirit or essential characteristics. The described embodiment is to be considered in all respects only as illustrative and not restrictive. The scope of the invention will be, therefore, indicated by claims rather than by the foregoing description. All changes which come within the meaning and range of equivalency of the claims are to be embraced within their scope.

I claim:

1. A method of covering an item with a framed cover comprising the steps of identifying an item to be covered;

determining the maximum planar dimensions of the item to be covered, wherein the maximum planar dimensions of the item to be covered are parallel to a reference plane;

using a framed cover comprised of a tubular frame having a plurality of straight members that fit together to make the tubular frame, at least two one-way hinges disposed opposite one another about the tubular frame, each one-way hinge connecting two members, wherein the tubular frame is sized so as to fit over the maximum planar dimensions of the item to be covered;

a flexible cover fabricated from a flexible material and having a continuous interior surface, a continuous exterior surface, and at least one opening, orthogonal to the continuous exterior surface, with a perimeter sized so as to allow it to fit over the maximum planar dimensions of the item to be covered;

wherein the flexible cover is operably coupled to the tubular frame, such that the opening of the flexible cover coincides with the tubular frame;

wherein the flexible cover terminates at the tubular frame;
wherein the flexible cover is unsupported except for the tubular frame; and
orienting the opening of the flexible cover and tubular frame to allow the maximum planar dimensions of the item to be covered to pass through; and
orienting the at least two one-way hinges into the tubular frame so that the frame remains fully opened while holding it over the item to be covered, thereby making the tubular frame rigid.

2. The method of covering an item with a framed cover of claim 1 comprising the additional steps of lowering the framed cover over the item to be covered.

3. The method of covering an item with a framed cover of claim 1 wherein the flexible cover has two openings, one terminating at the tubular frame and the other oriented distal to the tubular frame; and the method comprises the additional steps of raising the framed cover in order to cover the item to be covered.

4. The method of covering an item with a framed cover of claim 3, comprising the additional step of closing the second opening.

5. The method of covering an item with a framed cover of claim 1, wherein the reference plane is the ground.

6. The method of covering an item with a framed cover of claim 1, wherein the reference plane is the surface upon which the item to be covered is resting.

7. A method of assembling a framed cover suitable for covering an item comprising the steps of
identifying an item to be covered;
measuring the maximum planar dimensions of the item to be covered, wherein the maximum planar dimensions of the item to be covered are parallel to the surface upon which the item rests;
selecting a plurality of straight tubular members, at least one connector, and at least two one-way hinges, wherein, when configured to enclose a planar area, the plurality of members, at least one connector, and at least two one-way hinges having a perimeter that allows the maximum planar dimensions of the item to be covered to pass through;
assembling a rigid tubular frame from the plurality of straight members, at least one connector, and at least two one-way hinges, by connecting at least two members with each connector and by connecting at least two straight members with each one-way hinge, wherein, when assembled, the tubular frame has a perimeter enclosing a planar area that will allow the maximum planar dimensions of the item to be covered to pass through; and
operably coupling a flexible cover to the tubular frame, wherein the flexible cover has a continuous exterior surface, a continuous interior surface, and an opening that is at least as large as the perimeter of the tubular frame;
wherein the flexible cover is unsupported except for the rigid tubular frame;
wherein the at least two one-way hinges are oriented into the tubular frame so that the tubular frame is collapsible in one direction, but not any other direction; and
wherein the at least two one-way hinges are oriented so that the frame does not collapse while being placed the frame over the item to be covered, thereby making the frame rigid.

* * * * *